(12) United States Patent
Rogers et al.

(10) Patent No.: US 7,872,736 B2
(45) Date of Patent: Jan. 18, 2011

(54) DETECTING A DISTURBANCE IN THE PROPAGATION OF LIGHT IN AN OPTICAL WAVEGUIDE

(75) Inventors: Alan John Rogers, Bookham (GB); Sotiris Emil Kanellopoulos, London (GB); Sergey Vladimir Shatalin, Moscow (RU)

(73) Assignee: Fotech Solutions Limited, London (GB)

( * ) Notice: Subject to any disclaimer, the term of this patent is extended or adjusted under 35 U.S.C. 154(b) by 634 days.

(21) Appl. No.: 11/666,939

(22) PCT Filed: Nov. 3, 2005

(86) PCT No.: PCT/GB2005/004243

§ 371 (c)(1),
(2), (4) Date: Dec. 7, 2007

(87) PCT Pub. No.: WO2006/048647

PCT Pub. Date: May 11, 2006

(65) Prior Publication Data

US 2008/0297772 A1  Dec. 4, 2008

(30) Foreign Application Priority Data

Nov. 3, 2004 (GB) .................................. 0424305.1

(51) Int. Cl.
*G01N 21/00* (2006.01)
(52) U.S. Cl. ...................................... 356/73.1
(58) Field of Classification Search ................ 356/73.1; 398/17–24
See application file for complete search history.

(56) References Cited

U.S. PATENT DOCUMENTS 4,960,989 A  10/1990  Liebenrood et al. .... 250/227.15

(Continued)

FOREIGN PATENT DOCUMENTS

EP  0 685 722  12/1995

(Continued)

OTHER PUBLICATIONS

Healey, P., "Review of Long Wavelength Single-Mode Optical Fiber Reflectometry Techniques," Journal of Lightwave Technology, vol. LT-3, No. 4, pp. 876-886, Aug. 1985.

(Continued)

*Primary Examiner*—Gregory J Toatley
*Assistant Examiner*—Tara S Pajoohi
(74) *Attorney, Agent, or Firm*—K&L Gates LLP

(57) ABSTRACT

An optical time domain reflectometry apparatus has a laser and light modulator for producing coherent light pulses, each having two sections of higher intensity separated by a gap of lower or substantially zero intensity. As the light pulses propagate along the optical fibre, light is continuously Rayleigh backscattered by inhomogeneities of the optical fibre. A photodetector generates backscatter signals representing the intensity of light Rayleigh backscattered in the optical fibre as each light pulse travels along the optical fibre. The PC uses these backscatter signals to derive a difference signal representing a change dI in intensity between signals generated from two successive pulses. The PC then calculates the Root Mean Square (RMS) of the difference signal averaged over the interval between the two sections of the light pulses. Next, the PC averages the backscatter signal generated from the first of the pulses over the same interval and normalises the RMS difference signal using the averaged signal to obtain a compensated difference signal that depends only on differences in the rate of change of phase of light of the light pulses as they travelled along the waveguide. This is repeated at different wavelengths to allow the compensated difference signal to be adjusted to represent the magnitude of the differences.

26 Claims, 2 Drawing Sheets

U.S. PATENT DOCUMENTS

| | | | |
|---|---|---|---|
| 4,997,277 A * | 3/1991 | Horiguchi et al. | 356/73.1 |
| 5,194,847 A | 3/1993 | Taylor et al. | 340/557 |
| 5,384,635 A | 1/1995 | Cohen et al. | 356/73.1 |
| 6,630,658 B1 | 10/2003 | Bohnert et al. | 250/227.14 |

FOREIGN PATENT DOCUMENTS

| | | |
|---|---|---|
| GB | 2 137 767 | 10/1984 |
| GB | 2 190 186 | 11/1987 |
| GB | 2 212 651 | 7/1989 |
| GB | 2 243 908 | 11/1991 |
| JP | 58-132674 | 8/1983 |

OTHER PUBLICATIONS

Shatalin et al., "Interferometric Optical Time-Domain Reflectometry for Distributed Optical-Fiber Sensing," Applied Optics, vol. 37, No. 24, pp. 5600-5604, Aug. 20, 1998.

* cited by examiner

DETECTING A DISTURBANCE IN THE PROPAGATION OF LIGHT IN AN OPTICAL WAVEGUIDE

CROSS REFERENCE TO RELATED APPLICATIONS

The present application is a National Phase Application of International Application No. PCT/GB2005/004243, filed Nov. 3, 2005, which claims priority to Great Britain Patent Application No. 0424305.1, filed Nov. 3, 2004, which applications are incorporated herein fully by this reference.

FIELD OF THE INVENTION

This invention relates to an apparatus and method for detecting a disturbance in the propagation of light in an optical waveguide. More particularly, but not exclusively, the invention relates to improvements to Optical Time-Domain Reflectometry (OTDR) for detecting an externally induced disturbance in the phase of light propagating in a monomode optical fibre.

BACKGROUND TO THE INVENTION

OTDR is an established technique for analysing the propagation of light in an optical fibre. In the telecommunications industry, the technique is widely used to detect and locate damage to optical fibres. The intensity of light backscattered in an optical fibre as a light pulse travels along the fibre can be detected using a photodetector arranged at the end of the optical fibre into which the light pulse is transmitted. Analysing a signal representative of the detected backscattered light generated by the photodetector over time can allow determination of a spatial distribution of attenuation along the fibre. As attenuation tends to be greater at locations of damage, these locations can be identified from the determined spatial distribution.

It has also been recognised that when the light pulse is coherent and propagates in a monomode optical fibre, the backscattered light interferes to contribute a component to the intensity of light detected by the photodetector. The intensity of this component depends on the strength with which the light is backscattered and the phase of the light when it is backscattered, both of which vary randomly and indeterministically along the length of the fibre. In particular, whilst the phase of the light in the light pulse changes as the light pulse travels along the optical fibre at a relatively predictable and slow rate determined by the inherent refractive index of the fibre, external influences such as changes in temperature and pressure or the presence of acoustic waves, can effectively alter the refractive index of the optical fibre and hence the rate of change of phase of the light in the light pulse as it travels along the fibre. The magnitude of the component of the intensity of light detected by the photodetector due to interference can therefore change as these external influences change. This allows changes in the external influences to be detected from changes in the intensity of light backscattered in the fibre.

Conventionally, signals representing the intensity of light backscattered from successive pulses of light travelling along the fibre have been compared to one another and differences between the signals have been identified as changes in external influences affecting the rate of change of phase of light as it travels along the fibre. However, as any coherently related parts of a given light pulse can potentially interfere to contribute to the intensity of light detected by the photodetector, it can be difficult to resolve the location and magnitude of such changes accurately. For example, any detected change in intensity might be indicative of an external influence affecting the rate of change of phase of light as it travels along the fibre between any coherently related parts of the light pulse. Different external influences in different parts of the light pulse can also contribute different intensity components that combine to give a sum change in intensity at the photodetector. So, the resolution of the system is limited at best to the length of the light pulse. However, the light pulse must have a sufficiently long duration to allow the photodetector to generate a useful signal. Resolution is therefore limited. It is also difficult to determine or control the sensitivity of the apparatus to phase disturbances.

Furthermore, as both the strength of the backscatter and the phase of the light at the point of backscatter vary randomly along the fibre, the magnitude of any change in the intensity of the backscattered light detected by the photodetector is not necessarily proportional to the difference in the rate of change of phase of light propagating in the fibre caused by the external influence or such like. Conventional OTDR techniques for detecting such changes are therefore unable to derive information concerning the magnitude of changes in external influences acting on the optical fibre.

For example, U.S. Pat. No. 5,194,847 describes an intrusion detection system employing OTDR. It recognises that OTDR using coherent light can be used to detect changes in external influences that cause phase perturbations in an optical fibre. However, the document only describes making a straightforward comparison between time distributed intensities of light backscattered from successive light pulses propagating along the fibre and locating changes in external influences at positions of changes to the time distributed intensities. U.S. Pat. No. 5,194,847 does not recognise that the changes to the time distributed intensities between successive pulses do not convey accurate information concerning the magnitude of the changes in the external influences.

The paper "Interferometric Optical Time-Domain Reflectometry For Distributed Optical Fibre Sensing", Sergey V. Shatalin et al, Applied Optics, Vol 37, No. 24, 20 Aug. 1998 discusses the use of OTDR to detect changes in external influences affecting an optical fibre in detail. However, whilst this paper recognises that it is possible to detect the location of changes in effective refractive index of a fibre reliably, it is specifically noted that the magnitude of the change cannot reliably be detected.

The present invention seeks to overcome these problems.

SUMMARY OF THE INVENTION

According to a first aspect of the present invention, there is provided an apparatus for detecting a disturbance in the propagation of light in an optical waveguide, the apparatus having a light source for sending a light pulse along the waveguide, the light pulse being substantially coherent and varying in intensity over its duration to provide two sections of higher intensity separated from one another by a section of lower or substantially zero intensity.

According to a second aspect of the present invention there is provided a method of detecting a disturbance in the propagation of light in an optical waveguide, the apparatus having a light source for sending a light pulse along the waveguide, the light pulse being substantially coherent and varying in intensity over its duration to provide two sections of higher intensity separated from one another by a section of lower or substantially zero intensity.

The applicants have recognised that such a light pulse, which might be referred to as a "composite light pulse", can allow more effective detection of disturbances in the propagation of light in the waveguide. More specifically, localised differences in the rate of change of phase of light between successive light pulses travelling along the waveguide can be more accurately detected.

As the two sections of higher intensity of the pulse are coherently related, light backscattered from each of the two sections can interfere to contribute to the overall intensity of backscattered light. This interference depends on the phase between light backscattered from each of the sections of higher intensity of the light pulse. However, as the sections of higher intensity are separated from one another by a section of lower or substantially zero intensity, little or no light is backscattered from this section of the light pulse. With appropriate signal processing, differences in the phase between light backscattered from each of the two sections of higher intensity can therefore be resolved in the absence of or with very little contribution from light backscattered from within the section of lower or substantially zero intensity. So, differences in the rate of change of phase of light travelling along the waveguide in the section of lower intensity of the pulse can be accurately resolved.

Furthermore, sensitivity to phase disturbances can be controlled by varying the length of the section of lower or substantially zero intensity. Indeed, it is preferred that the apparatus comprises means for selecting the length of the section of lower or substantially zero intensity. Similarly, the method may comprise selecting the length of the section of lower or substantially zero intensity. Longer sections of lower intensity can provide increased sensitivity.

The pulse should be substantially coherent. In other words, the two sections of higher intensity of the pulse should ideally be mutually coherent. All that is required is that interference arising from backscattering of the coherent light of the light pulse can be detected and discerned from light present due to other backscattering. In other words, the light pulses should ideally be sufficiently coherent that light backscattered as they travel along the waveguide has at least a component of intensity detectable by a photodetector arising from interference between light backscattered from each of the two sections of higher intensity of the light pulses. Expressed in more mathematical terms, the Fourier transform (FT) of the convolution of the wave function representing the total light pulse with a wave function representing the light backscattered from the pulse in the waveguide should ideally contain all the frequencies in the backscatter wave function. This requires, as a consequence of the FT convolution theorem, that the pulse's wave function contains all the frequencies of the backscatter wave function. This condition is met optimally in practice by the two sections of higher intensity of the light pulse each having substantially constant intensity. In other words, the light pulse should have a substantially square waveform. It is also preferred that the two sections of higher intensity of the light pulse are identical, e.g. in duration and magnitude. However, other pulse shapes may provide acceptable results where the convolutions are able to meet the specific performance requirements for particular applications. In other words, the pulse's intensity function may lack some of the frequencies present in the backscatter function for some applications.

The apparatus preferably has a photodetector for generating a signal representing a time distributed intensity of light backscattered in the waveguide as the light pulse travels along the waveguide. Ideally, the photodetector should be able to detect all of the frequencies present in the coherently backscattered light. It is also useful for the backscattered light to be averaged over a period around equal to the duration (e.g. temporal extent at a single point) of one of the sections of higher intensity of the light pulses. The photodetector can therefore conveniently have a response time approximately equal to the duration of each of the shorter section of higher intensity of the light pulse.

Usually, the light source sends (at least) two such light pulses (each have two sections of higher intensity separated from one another by a section of lower or substantially zero intensity) along the waveguide and the photodetector generates first and second such signals, one for each of the light pulses. The apparatus may then have processing means for deriving a difference signal indicative of differences between the first and second signals. Furthermore, the apparatus may have processing means for: averaging the first signal over a period approximately equal to the duration of the light pulses; calculating a root mean square of the difference signal and averaging this over a period approximately the same as the period of averaging of the first signal; and normalising the averaged root mean square of the difference signal using the averaged first signal to derive a compensated difference signal indicative of a change in the propagation of light in the waveguide. Likewise, the method may comprise averaging the first signal over a period approximately equal to the duration of the light pulses; calculating a root mean square of the difference signal and averaging this over a period approximately the same as the period of averaging of the first signal; and normalising the averaged root mean square of the difference signal using the averaged first signal to derive a compensated difference signal indicative of a change in the propagation of light in the waveguide.

Despite this processing, some ambiguity can remain in magnitude of the change in the propagation of light in the optical fibre. More specifically, it is difficult to discern phase changes including integer multiples of $\pi$ from one another. The light source preferably therefore sends light pulses having different wavelengths along the waveguide. More specifically, the light source may send a further two such light pulses along the waveguide having a different wavelength to the two such light pulses and the photodetector may generate further first and second such signals, one for each of the further pair of light pulses.

Comparison of the light backscattered from the light pulses of different wavelength can resolve ambiguity in the phase change. For example, the apparatus may have a processor for deriving a further difference signal indicative of differences between the further first and second signals. The apparatus may also have processing means for comparing the difference signals to derive an adjusted difference signal indicating the magnitude of the change in the propagation of light in the waveguide. Indeed, more preferably, the apparatus may have processing means for: averaging the further first signal over a period approximately equal the duration of the further two such light pulses; calculating a root mean square of the further difference signal and averaging this over a period approximately the same as the period of averaging of the further first signal; normalising the root mean square of the further difference signal using the averaged further first signal to derive a further compensated difference signal indicative of a change in the propagation of light in the waveguide; and comparing the compensated difference signals at the two different wavelengths to generate an adjusted compensated difference signal indicative of the magnitude of the change in the propagation of light in the waveguide. Likewise, the method may comprise averaging the further first signal over a period approximately equal the duration of the further two such light pulses; calculating a root mean square of the further difference signal and averaging this over a period approximately the same as the period of averaging of the further first signal; normalising the root mean square of the further difference signal using the averaged further first signal to derive a further compensated difference signal indicative of a change in the propagation of light in the waveguide; and comparing the compensated difference signals at the two different wavelengths to generate an adjusted compensated difference signal indicative of the magnitude of the change in the propagation of light in the waveguide.

Expressed differently, also according to another aspect of the present invention, there is provided an apparatus for optical time domain reflectometry in a monomode optical waveguide using pairs of substantially mutually coherent light pulses. Similarly, according to another aspect of the present invention, there is provided a method of optical time domain reflectometry in a monomode optical waveguide using pairs of substantially mutually coherent light pulses.

Again, expressed differently, according to another aspect of the present invention, there is provided a method of phase disturbance location comprising:

causing a coherent optical pulse to propagate within a monomode optical fibre;

detecting a Rayleigh-backscattered, interference, difference signal, from successive optical pulses;

time-resolving the signal to yield a distribution of any optical-phase disturbances imposed on the fibre by external influences; and enhancing the signal in respect to noise due to variations in backscatter amplitudes by normalising to undisturbed values.

The signal may be enhanced in respect of noise due to variations in the amplitude and phase of the backscatter by employing a coherent-pulse shape which allows detection and resolution of the scatter structure within the pulse, and a suitable averaging and normalisation of the resulting signal structure.

Use of the term "processing means" above is intended to be general rather than specific. Whilst some aspects of the invention may be carried out using an individual processor, such as a digital signal processor (DSP) or central processing unit (CPU), they could equally well be carried out in other parts or components of the device. For example, a Radio Frequency (RF) unit may include some processing functionality and/or the device may include multiple processors for carrying out different features of the invention. Similarly, the invention could be implemented using a hard-wired circuit or circuits, or by embedded software. For example, the invention may be implemented using complementary metal oxide semiconductor (CMOS) circuitry. The word "processor" is therefore intended to be functional rather than literal and should be considered to include the terms "processors", "processing means", "circuit" or "circuits" as appropriate.

Preferred embodiments of the invention are now described, by way of example only, with reference to the accompanying drawings.

DETAILED DESCRIPTION OF THE PREFERRED EMBODIMENTS

Figure 1:
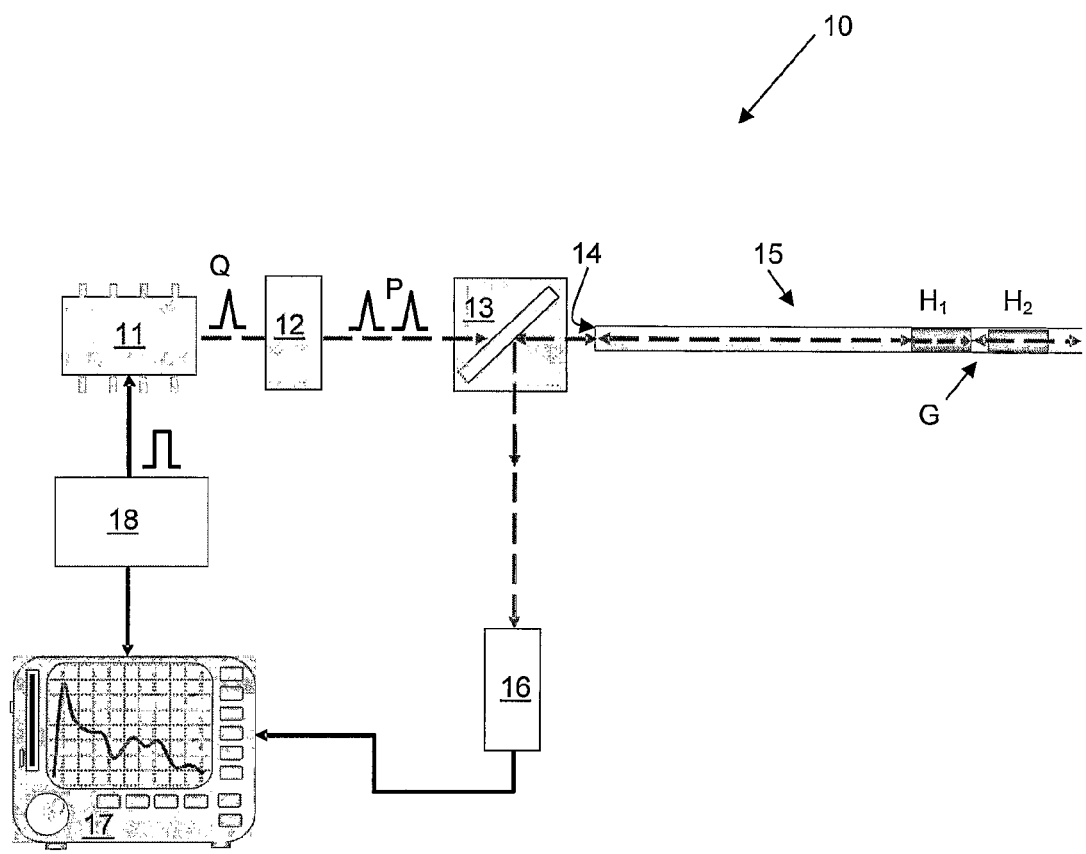
FIG. 1 is a schematic illustration of an optical time domain reflectometry apparatus for implementing the invention.

Referring to FIG. 1, an optical time domain reflectometry apparatus 10 has a laser 11 for producing light Q. The laser 11 is arranged to output the light Q it produces to a light modulator 12 for modulating the light Q to produce light pulses P. The light pulses P produced by the light modulator 12 each have two sections $H_1$, $H_2$ of higher intensity separated by a gap G of lower intensity. Indeed, in this embodiment, the gap G of lower intensity has substantially zero intensity and each of the sections $H_1$, $H_2$ of higher intensity are effectively individual pulses of light, except that they are substantially mutually coherent, as described below in more detail. The light modulator 12 is adapted to vary the duration of the gap G of lower intensity of the light pulses to vary the resolution of the apparatus 10. A smaller gap G can provide increased resolution. In another embodiment, the light modulator 12 provides a first of the two sections $H_1$, $H_2$ of higher intensity and the second of the two sections $H_1$, $H_2$ of higher intensity is generated from the first of the two sections $H_1$, $H_2$ of higher intensity. More specifically, a combination of fused couplers and a delay line is used to generate the second of the two sections $H_1$, $H_2$ of higher intensity from the first of the two sections $H_1$, $H_2$ of higher intensity. The output light pulses P remain effectively the same.

The light modulator 12 is arranged to output the light pulses P it produces to a beam splitter 13 for splitting the light pulses P between two different outputs. One output of the beam splitter 13 directs light split from the light pulses P into an end 14 of an optical fibre 15. The other output of the beam splitter 13 directs light split from the light pulses P to a photodetector 16. The photodetector 16 generates reference signals representing the light pulses P as they are sent into the optical fibre 15. The photodetector 16 outputs the reference signals to a PC 17, which uses them to check the timing and duration of the light pulses P and the duration of the gap G of the light pulses P sent along the optical fibre 15 and to control the laser 11 and light modulator 12 to vary the timing of the light Q output by the laser 11, the timing and duration of the optical pulses P and the duration of the gap G of the optical pulses P output by the light modulator 12, as appropriate.

As the light pulses P propagate along the optical fibre 15, light is continuously Rayleigh backscattered by inhomogeneities of the optical fibre 15. The beam splitter 13 is arranged to redirect light output from the end 14 of the optical fibre 15 after Rayleigh backscattering in the fibre 15 to the photodetector 16. The light pulses P are sent along the optical fibre 15 successively, with a delay between each light pulse P sufficient to allow each light pulse P to travel along the length of the optical fibre 15 to be interrogated and the photodetector 16 to receive the light Rayleigh backscattered from the pulse P in the length of the optical fibre 15 before the next light pulse P is sent along the optical fibre 15. So, the photodetector 16 generates backscatter signals representing the intensity of light Rayleigh backscattered in the optical fibre 15 as each light pulse P travels along the optical fibre 15. The PC 17 uses these backscatter signals to derive and output a signal indicative of a change in propagation of light in the optical fibre 15 between successive light pulses P, as described in more detail below The light Q output by the laser 11 is substantially coherent. More specifically, in this embodiment, the laser 11 is a semiconductor laser having a spectral line width of less than around 50 MHz. This means that, provided the overall duration of the light pulses P are short enough, e.g. less than around 20 ns, the sections $H_1$, $H_2$ of higher intensity of the respective light pulses P are coherently related to one another, e.g. are "mutually coherent". This means that substantially all parts of each respective light pulse P are phase related.

As the light pulses P travel along the optical fibre 15, the phase of the light of the light pulses P gradually changes according to the light propagation characteristics of the optical fibre 15 or, more specifically, the fibre's birefringence.

However, when the propagation of light in the optical fibre 15 is disturbed at a point along the optical fibre 15, e.g. as the result of a change in the environment of the optical fibre 15, the light undergoes an additional change in phase as it passes that point. This can be considered to be due to a change in the effective refractive index or optical path length of the optical fibre 15. We refer to this additional change in phase as an additional phase angle dφ/2 and, in order to simplify the mathematics, we assume that this additional phase angle dφ/2 is small (e.g. <<π/2), although this is not a strict requirement for the validity of the overall concept described below. The light pulses P can then be modelled by supposing that the Rayleigh backscattering within the first section $H_1$, prior to the point of the disturbance, adds to produce light having an electric field vector $E_1$, whilst the Rayleigh backscattering within the second section $H_2$, after the point of disturbance, adds to produce light having electric field vector $E_2$ and the phase difference between these electric field vectors $E_1$ and $E_2$ is φ for a light pulse P unaffected by the disturbance and φ+dφ/2 for a light pulse P affected by the disturbance.

The photodetector 16 has a response time approximately equal to the duration of either one of the sections $H_1$, $H_2$ of higher intensity of the light pulses P. The photodetector 16 therefore averages the Rayleigh backscattered light it receives to output a backscatter signal representing an optical intensity I given by $$I = |E_1|^2 + |E_2|^2 + 2|E_1||E_2|\cos\phi \quad (1)$$

for a light pulse P unaffected by the disturbance. The equivalent signal for a light pulse P affected by the disturbance represents an optical intensity including a change dI in intensity of the light received at the photodetector 16 resulting from the presence of the additional phase angle dφ/2 contributed by the disturbance, which change dI in intensity is given by $$dI = -2|E_1||E_2|\sin\phi \cdot d\phi \quad (2)$$

If this change dI in intensity is spatially averaged over a distance equal to the interval between the two sections $H_1$, $H_2$ of the affected light pulse P, then we obtain $$\langle dI \rangle = -\langle 2|E_1||E_2|\sin\phi \cdot d\phi \rangle \quad (3)$$

However, as φ varies randomly over all angles from +π to −π over this averaging distance, equation (3) is equal to zero. So, instead, the difference signal can be first squared then averaged to obtain $$\langle dI^2 \rangle = \langle 4|E_1|^2 \sin^2\phi \cdot d\phi^2 \rangle \quad (4)$$

which has a non-zero value.

The magnitude of the electric field vectors and phases $E_1$, $E_2$, φ and dφ all vary independently, so that the change dI in intensity is a maximum $dI_{max}$ when $$\langle |E_1|^2 \rangle = \langle |E_2|^2 \rangle = \langle |E_1||E_2| \rangle = \langle |E|^2 \rangle \quad (5)$$

and $$\langle \cos 2\phi \rangle = 0 \quad (6)$$

Consequently, expanding $\sin^2 \phi$ and taking the square root to give the Root Mean Square (RMS) of the maximum $dI_{max}$ of the change dI in intensity gives $$\langle dI_{max}^2 \rangle^{\frac{1}{2}} = \sqrt{2}\langle |E|^2 \rangle |d\phi| \quad (7)$$

If this maximum $dI_{max}$ of the change dI in intensity is then normalised using the optical intensity I before the disturbance averaged over the same averaging distance, we obtain $$\frac{\langle dI_{max}^2 \rangle^{\frac{1}{2}}}{\langle I \rangle} = \frac{\sqrt{2}\langle |E|^2 \rangle |d\phi|}{2\langle |E|^2 \rangle} = \frac{|d\phi|}{\sqrt{2}} \quad (8)$$

which depends only on the phase angle dφ/2 added by the disturbance.

So, the PC 17 obtains a difference signal representing the change dI in intensity by subtracting a backscatter signal of a second pulse P from the backscatter signal of a first (preceding) pulse P. The PC 17 then calculates the Root Mean Square (RMS) or modulus of the difference signal averaged over the interval between the two sections $H_1$, $H_2$ of the light pulses P. In other words, the PC 17 squares the difference signal, averages the squared signal over the interval and the takes the square root of the averaged signal. Next, the PC 17 averages the backscatter signal of the first pulse P over the same interval and normalises the RMS difference signal using the averaged backscatter signal of the first pulse P to obtain an compensated difference signal that depends only on the phase angle dφ/2 added by the disturbance. So, the effect of other random variations in the electric field vectors $E_1$, $E_2$ and phase φ can be eliminated. Using this method, the PC 17 can therefore derive a compensated difference signal that is proportional to the magnitude of the addtional phase angle(s) dφ/2 added to the light pulse P by (the) disturbance(s) affecting the optical fibre 15 and has greater visibility than a signal affected by the random variations in the electric field vectors $E_1$, $E_2$ and phase φ.

It will be recalled that we have so far assumed that the phase angle dφ/2 added by the disturbance is small. In practice, this might not be the case. So, it can be appreciated that there may be ambiguity in the measurement of an actual phase change $|d\phi_p|$ resulting from the disturbance when the actual phase change $|d\phi_p|$ is greater than π or when $$|d\phi_p| \geq \pi \quad (9)$$

This ambiguity can be resolved by carrying out the method using light pulses P having different optical wavelengths. To see this, suppose that the actual phase change $|d\phi_p|$ resulting from the disturbance is equal to an integer m multiple of π plus a remainder phase change $d\phi_m$ less than π or $$|d\phi_p| = m\pi + |d\phi_m| \quad (10)$$

The apparatus 10 described so far only detects the remainder phase change $|d\phi_m|$, as integer m multiples of π do not change the interference at the photodetector 16. However, $$|d\phi_P| = m\pi + |d\phi_m| = \frac{2\pi|\Delta n|l}{\lambda} \quad (11)$$

where $|\Delta n|$ is the modulus of the effective perturbation in the refractive index of the optical fibre 15 resulting from the disturbance, λ is the wavelength of light of the light pulse P and l is the spatial resolution length (equal to the length of the optical pulse P). The only unknowns in this equation are m and $|\Delta n|$. Measurement of the remainder phase change $|d\phi_m|$ at two known wavelengths therefore determines m and removes the ambiguity, allowing the true magnitude of the phase change $|d\phi_p|$ to be determined. So, in a further embodiment, the apparatus 10 varies the light pulses P sent into the optical fibre 15 can between two different wavelengths and compares the compensated difference signals obtained at each of the different wavelengths using the above method to generate an adjusted further compensated difference signal in which the magnitude(s) of the actual phase change(s) $|d\phi_p|$ caused by the disturbance(s) are accurately represented.

Figure 2:
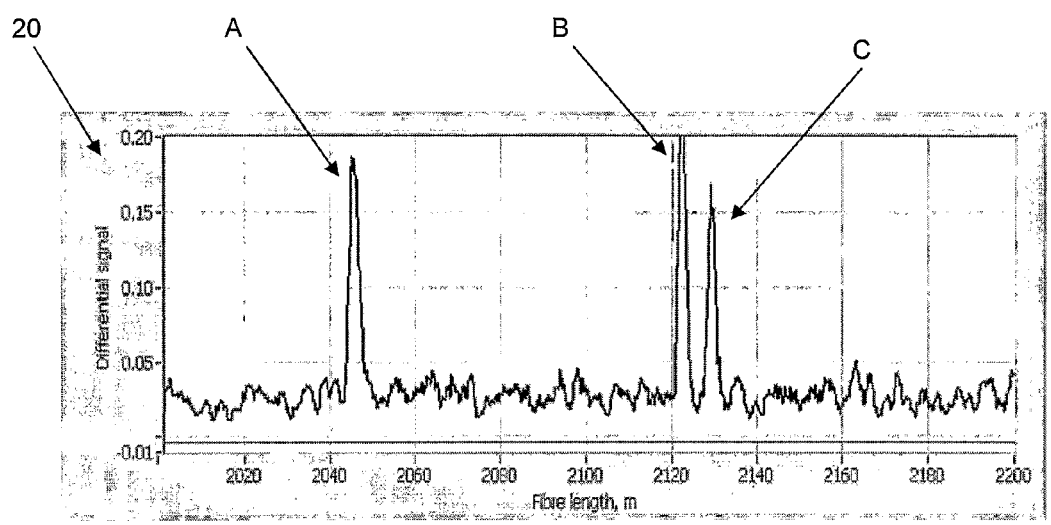
FIG. 2 is an illustration of an output of the apparatus of FIG. 1.

Referring to FIG. 2, in this embodiment, the adjusted compensated difference signal is a trace representing the actual phase change(s) $|d\phi_p|$ occurring along the length of the optical fibre 15 that is interrogated. In other words, the backscatter signals are analysed over a period of time corresponding to when the photodetector 16 receives light Rayleigh backscattered in the length of the optical fibre 15 that is interrogated. In FIG. 2, the location of three simultaneous phase disturbances occurring at distances of 2044, 2121 and 2127 m, respectively, from the end of the optical fibre 15 can be seen. The height of each peak is directly proportional to the magnitude of the disturbances.

When disturbances affecting the propagation of light in the optical fibre 15 result from a measurand field acting upon the fibre 15, the spatial distribution of the field may be inferred from the distribution of the phase disturbances. Examples of such fields are pressure, strain and temperature and measurement of these fields can therefore be achieved using the invention. A particular example of this is a perimeter security systems, in which the optical fibre 15 is laid along a perimeter and used to detect pressure, strain or vibrations along the perimeter that may be indicative of an intrusion. Other applications include leak detection and tamper monitoring in pipelines and fluid containers, and in seismic sounding. The apparatus 10 is particularly useful for sensing the influence of acoustic waves on the optical fibre 15.

The described embodiments of the invention are only examples of how the invention may be implemented. Modifications, variations and changes to the described embodiments will occur to those having appropriate skills and knowledge. These modifications, variations and changes may be made without departure from the spirit and scope of the invention defined in the claims and its equivalents.

The invention claimed is:

1. An apparatus for detecting a disturbance in the propagation of light in an optical waveguide comprising:
   a light source for sending a light pulse along the waveguide, the light pulse being substantially coherent and varying in intensity over its duration to provide two sections of higher intensity separated from one another by a section of lower or substantially zero intensity;
   a photodetector for generating a signal representing a time distributed intensity of light backscattered in the waveguide as the light pulse travels along the waveguide; and
   a processor in communication with the photodetector,
   wherein the light source sends two such light pulses along the waveguide,
   wherein the photodetector generates first and second such signals, one for each of the light pulses, and
   wherein the processor derives a difference signal indicative of differences between the first and second signals.

2. The apparatus of claim 1, further comprising means for selecting sensitivity to the disturbance by varying the length of the section of lower or substantially zero intensity.

3. The apparatus of claim 1, wherein the intensity of the light pulse varies with a substantially square waveform.

4. The apparatus of claim 1, wherein the photodetector has a response time approximately equal to the duration of either of the two sections of higher intensity of the light pulse.

5. The apparatus of claim 1, wherein the processor further performs the steps of:
   averaging the first signal over a period approximately equal to the duration of the light pulses;
   calculating a root mean square of the difference signal and averaging this over a period approximately the same as the period of averaging of the first signal; and
   normalising the averaged root mean square of the difference signal using the averaged first signal to derive a compensated difference signal indicative of a change in the propagation of light in the waveguide.

6. The apparatus of claim 1, wherein the light source sends light pulses having different wavelengths along the waveguide.

7. The apparatus of claim 1, wherein the light source sends a further two such light pulses along the waveguide having a different wavelength from the two such light pulses and the photodetector generates further first and second such signals, one for each of the further light pulses.

8. The apparatus of claim 7, having processing means for deriving a further difference signal indicative of differences between the further first and second signals.

9. The apparatus of claim 8, wherein the processor further executes the steps of:
   averaging the further first signal over a period approximately equal the duration of the further two such light pulses;
   calculating a root mean square of the further difference signal and averaging this over a period approximately the same as the period of averaging of the further first signal;
   normalising the averaged root mean square of the further difference signal using the averaged further first signal to derive a further compensated difference signal indicative of a change in the propagation of light in the waveguide; and
   comparing the compensated difference signals at the two wavelengths to generate an adjusted compensated difference signal indicative of the magnitude of the change in the propagation of light in the waveguide.

10. The apparatus of claim 7, wherein the processor further executes the step of comparing the difference signals to derive an adjusted difference signal indicating the magnitude of the change in the propagation of light in the waveguide.

11. An apparatus for optical time domain reflectometry comprising the apparatus of claim 1.

12. An apparatus for detecting a change in the effective refractive index or optical path length of an optical waveguide comprising the apparatus of claim 1.

13. The apparatus of claim 1, wherein at least one of the light pulses is sufficiently coherent that light backscattered as it travels along the waveguide has at least a component of intensity detectable by the photodetector arising from interference between light backscattered from each of the two sections of higher intensity of the light pulse.

14. A method of detecting a disturbance in the propagation of light in an optical waveguide, comprising the steps of:
   sending at least first and second light pulses along the waveguide, each light pulse being substantially coherent and each varying in intensity over its duration to provide two sections of higher intensity separated from one another by a section of lower or substantially zero intensity;
   generating first and second signals representing time distributed intensity of light backscattered in the waveguide as the respective first and second light pulses travel along the waveguide; and
   deriving a difference signal indicative of differences between the first and second signals.

15. The method of claim 14, further comprising selecting sensitivity to the disturbance by varying the length of the section of lower or substantially zero intensity.

16. The method of claim 14, wherein the intensity of the light pulse varies with a substantially square waveform.

17. The method of claim 14, wherein a signal is generated with a response time approximately equal to the duration of each of the sections of higher intensity of the light pulse.

18. The method of claim 14, further comprising:
averaging the first signal over a period approximately equal to the duration of the light pulses;
calculating a root mean square of the difference signal and averaging this over a period approximately the same as the period of averaging of the first signal; and
normalising the averaged root mean square of the difference signal using the averaged first signal to derive a compensated difference signal indicative of a change in the propagation of light in the waveguide.

19. The method of claim 14, further comprising sending light pulses having different wavelengths along the waveguide.

20. The method of claim 14, further comprising sending a further two such light pulses along the waveguide having a different wavelength to the prior two such light pulses and generating further first and second such signals, one for each of the further light pulses.

21. The method of claim 20, comprising deriving a further difference signal indicative of differences between the further first and second signals.

22. The method of claim 21, comprising comparing the difference signals to derive an adjusted difference signal indicating the magnitude of the change in the propagation of light in the waveguide.

23. The method of claim 21, comprising:
averaging the further first signal over a period approximately equal the duration of the further two such light pulses;
calculating a root mean square of the further difference signal over a period approximately the same as the period of averaging of the further first signal;
normalising the averaged root mean square of the further difference signal using the averaged further first signal to derive a difference signal indicative of a change in the propagation of light in the waveguide; and
comparing the difference signals at the two wavelengths to indicate the magnitude of the change in the propagation of light in the waveguide.

24. A method of optical time domain reflectometry comprising the method of claim 14.

25. A method of detecting a change in the effective refractive index or optical path length of an optical waveguide comprising the method of claim 14.

26. The method of claim 14, wherein each of the first and the second light pulses is sufficiently coherent that light backscattered as it travels along the waveguide has at least a component of intensity detectable by the photodetector arising from interference between light backscattered from each of the two sections of higher intensity of the light pulse.

\* \* \* \* \*